US012665427B2

(12) United States Patent
Vieira de Souza et al.

(10) Patent No.: US 12,665,427 B2
(45) Date of Patent: Jun. 23, 2026

(54) CONDITIONALLY REGULATED HYBRID ELECTRIC HVDC ARCHITECTURE

(71) Applicant: Hamilton Sundstrand Corporation, Charlotte, NC (US)

(72) Inventors: Carlos Eduardo Vieira de Souza, Huntley, IL (US); Jung Muk Choe, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 190 days.

(21) Appl. No.: 18/750,875

(22) Filed: Jun. 21, 2024

(65) Prior Publication Data

US 2025/0392133 A1     Dec. 25, 2025

(51) Int. Cl.
| | |
|---|---|
| *H02J 3/36* | (2026.01) |
| *B64D 27/33* | (2024.01) |
| *B64D 27/357* | (2024.01) |
| *B64D 31/18* | (2024.01) |
| *H02J 3/38* | (2006.01) |
| *H02J 105/30* | (2026.01) |

(52) U.S. Cl.
CPC ................ *H02J 3/36* (2013.01); *B64D 27/33* (2024.01); *H02J 3/381* (2013.01); *B64D 2221/00* (2013.01); *H02J 2105/32* (2026.01)

(58) Field of Classification Search
CPC .. B64D 27/33; B64D 27/357; B64D 2221/00; B64D 31/18; H02J 3/36; H02J 3/381; H02J 2105/32
See application file for complete search history.

(56) References Cited

U.S. PATENT DOCUMENTS

| | | | |
|---|---|---|---|
| 9,787,101 B2 | 10/2017 | DiVito et al. | |
| 10,414,477 B2 | 9/2019 | Himmelmann | |
| 11,697,350 B2 | 7/2023 | McRoberts et al. | |
| 11,873,109 B2 | 1/2024 | Trainer et al. | |
| 11,932,408 B2 | 3/2024 | Salanne et al. | |
| 2008/0179956 A1* | 7/2008 | Jiang ...................... H04L 12/10 | |
| | | | 307/66 |
| 2011/0121769 A1* | 5/2011 | Rozman ................... H02J 3/38 | |
| | | | 318/400.27 |
| 2017/0129617 A1* | 5/2017 | Shah .................... B64D 35/024 | |
| 2022/0153423 A1 | 5/2022 | Klonowski et al. | |
| 2022/0281610 A1* | 9/2022 | Bruce ...................... H02J 4/00 | |

* cited by examiner

*Primary Examiner* — Sisay G Tiku

(57) ABSTRACT

A method includes determining an operating mode of a hybrid electric propulsion system. The hybrid electric propulsion system includes a conditionally regulated high voltage direct current (HVDC) architecture. The conditionally regulated HVDC architecture includes a first switchable circuit formed between an HVDC bus, an HVDC electrical source, and a bi-directional direct current to direct current (DC-DC) converter configured to regulate electrical power flowing between the HVDC bus and the HVDC electrical source. The conditionally regulated HVDC architecture also includes a second switchable circuit formed between the HVDC bus and the HVDC electrical source. The method also includes configuring the conditionally regulated HVDC architecture based on the determined operating mode.

17 Claims, 4 Drawing Sheets

CONDITIONALLY REGULATED HYBRID ELECTRIC HVDC ARCHITECTURE

TECHNICAL FIELD

This disclosure generally relates to hybrid electric propulsion systems. More specifically, this disclosure relates to a conditionally regulated hybrid electric high voltage direct current (HVDC) architecture.

BACKGROUND

An apparatus such as an aircraft may include a mild hybrid electric propulsion architecture. In a mild hybrid electric propulsion architecture, a motor drive system (MDS) including one or more electric motor/generators, typically powered by batteries, is installed in an engine to assist the engine in peak propulsion demand moments. When extra power is not needed by the engine, the one or more electric motor/generators assume a generator function and extract mechanical power from the engine to provide electric power to charge the batteries, whose energy was consumed during the motoring operation, as well as serve as a power source for other equipment included in the apparatus.

SUMMARY

This disclosure relates to a conditionally regulated hybrid electric high voltage direct current (HVDC) architecture.

In some examples, a method may include determining an operating mode of a hybrid electric propulsion system, where the hybrid electric propulsion system includes a conditionally regulated HVDC architecture. The conditionally regulated HVDC architecture may include a first switchable circuit formed between an HVDC bus, an HVDC electrical source, and a bi-directional direct current to direct current (DC-DC) converter configured to regulate electrical power flowing between the HVDC bus and the HVDC electrical source. The conditionally regulated HVDC architecture may also include a second switchable circuit formed between the HVDC bus and the HVDC electrical source. The method may also include configuring the conditionally HVDC voltage architecture based on the determined operating mode.

Any single one or any combination of the following features may be used with the examples above. When the operating mode is determined to be a motoring mode, configuring the conditionally regulated HVDC architecture may include switching the DC-DC converter out of the first switchable circuit such that electrical power is unable to flow between the HVDC bus and the DC-DC converter, and switching the HVDC electrical source into the second switchable circuit such that unregulated electrical power is able to flow from the HVDC electrical source to the HVDC bus. After switching the HVDC electrical source into the second switchable circuit, unregulated electrical power flows from the HVDC electrical source to a motor/generator electrically coupled to the HVDC bus. When the operating mode is determined to be a generation mode, configuring the conditionally regulated HVDC architecture may include switching the DC-DC converter into the first switchable circuit such that electrical power regulated by the DC-DC converter flows between the HVDC electrical source and the HVDC bus, and switching the HVDC electrical source out of the second switchable circuit such that unregulated electrical power is unable to flow between the HVDC electrical source and the HVDC bus. After switching the DC-DC converter into the first switchable circuit, the HVDC electrical source receives power regulated by the DC-DC converter from a motor/generator electrically coupled to the HVDC bus. When the operating mode is determined to be a pre-charge mode, configuring the conditionally regulated HVDC architecture may include switching the DC-DC converter into the first switchable circuit such that an electrical voltage of the HVDC bus matches an electrical voltage of the HVDC electrical source regulated by the DC-DC converter, and after the electrical voltage of the HVDC bus matches the electrical voltage of the HVDC electrical source regulated by the DC-DC converter, switching the HVDC electrical source into the second switchable circuit such that unregulated electrical power flows from the HVDC electrical source to the HVDC bus, and switching the HVDC electrical source into the second switchable circuit such that unregulated electrical power flows from the HVDC electrical source to the HVDC bus. After switching the HVDC electrical source into the second switchable circuit, unregulated electrical power flows from the HVDC electrical source to a motor/generator electrically coupled to the HVDC bus.

In other examples, an apparatus may include at least one processor configured to determine an operating mode of a hybrid electric propulsion system including a conditionally HVDC voltage architecture. The conditionally regulated HVDC architecture may include a first switchable circuit formed between an HVDC bus, an HVDC electrical source, and a bi-directional DC-DC converter configured to regulate electrical power flowing between the HVDC bus and the HVDC electrical source. The conditionally regulated HVDC architecture may also include a second switchable circuit formed between the HVDC bus and the HVDC electrical source. The at least one processor may also be configured to configure the conditionally regulated HVDC architecture based on the determined operating mode.

Any single one or any combination of the following features may be used with the examples above. To configure the conditionally regulated HVDC architecture when the operating mode is determined to be a motoring mode, the at least one processor may be configured to switch the DC-DC converter out of the first switchable circuit such that electrical power is unable to flow between the HVDC bus and the DC-DC converter, and switch the HVDC electrical source into the second switchable circuit such that unregulated electrical power is able to flow from the HVDC electrical source to the HVDC bus. When the HVDC electrical source is switched into the second switchable circuit, unregulated electrical power is able to flow from the HVDC electrical source to a motor/generator electrically coupled to the HVDC bus. To configure the conditionally regulated HVDC architecture when the operating mode is determined to be a generation mode, the at least one processor may be configured to switch the DC-DC converter into the first switchable circuit such that electrical power regulated by the DC-DC converter is able to flow between the HVDC electrical source and the HVDC bus, and switch the HVDC electrical source out of the second switchable circuit such that unregulated electrical power is unable to flow between the HVDC electrical source and the HVDC bus. When the DC-DC converter is switched into the first switchable circuit, the HVDC electrical source is able to receive power regulated by the DC-DC converter from a motor/generator electrically coupled to the HVDC bus. To configure the conditionally regulated HVDC architecture when the operating mode is determined to be a pre-charge mode, the at least one processor may be configured to switch the DC-DC converter into the first switchable circuit such that an electrical voltage of the HVDC bus matches an electrical voltage of the HVDC electrical source regulated by the DC-DC converter, and after the electrical voltage of the HVDC bus matches with the electrical voltage of the HVDC electrical source regulated by the DC-DC converter, switch the HVDC electrical source into the second switchable circuit such that unregulated electrical power is able to flow from the HVDC electrical source to the HVDC bus, and switch the DC-DC converter out of the second switchable circuit such that electrical power is unable to flow between the HVDC bus and the DC-DC converter. When the HVDC electrical source is switched into the second switchable circuit, unregulated electrical power is able to flow from the HVDC electrical source to a motor/generator electrically coupled to the HVDC bus. The at least one processor may be configured to switch between the HVDC bus and a low voltage DC bus.

In still other examples, a system may include an engine and at least one motor/generator. The at least one motor/generator may be configured to provide mechanical power to the engine during a motoring mode and generate electricity from mechanical power provided by the engine during a generation mode. The system may also include a conditionally regulated HVDC architecture electrically coupled to an input/output of the motor/generator. The conditionally regulated HVDC architecture may include a first switchable circuit formed between an HVDC bus, an HVDC electrical source, and a bi-directional DC-DC converter configured to regulate electrical power flowing between the HVDC bus and the HVDC electrical source. The conditionally regulated HVDC architecture may also include a second switchable circuit formed between the HVDC bus and the HVDC electrical source, and a controller. The controller may be configured to determine an operating mode of the system and configure the conditionally regulated HVDC architecture based on the determined operating mode.

Any single one or any combination of the following features may be used with the examples above. To configure the conditionally regulated HVDC architecture when the operating mode is determined to be a motoring mode, the controller may be configured to switch the DC-DC converter out of the first switchable circuit such that electrical power is unable to flow between the HVDC bus and the DC-DC converter, and switch the HVDC electrical source into the second switchable circuit such that unregulated electrical power is able to flow from the HVDC electrical source to the HVDC bus. When the HVDC electrical source is switched into the second switchable circuit, unregulated electrical power is able to flow from the HVDC electrical source to a motor/generator electrically coupled to the HVDC bus. The system may further include a charging protection circuit configured to prevent flow of electrical power from the HVDC bus to the HVDC electrical source. To configure the conditionally regulated HVDC architecture when the operating mode is determined to be a generation mode, the controller may be configured to switch the DC-DC converter into the first switchable circuit such that electrical power regulated by the DC-DC converter is able to flow between the HVDC electrical source and the HVDC bus, and switch the HVDC electrical source out of the second switchable circuit such that unregulated electrical power is unable to flow between the HVDC electrical source and the HVDC bus. When the DC-DC converter is switched into the first switchable circuit, the HVDC electrical source is able to receive power regulated by the DC-DC converter from a motor/generator electrically coupled to the HVDC bus. To configure the conditionally regulated HVDC architecture when the operating mode is determined to be a pre-charge mode, the controller may be configured to switch the DC-DC converter into the first switchable circuit such that an electrical voltage of the HVDC bus matches an electrical voltage of the HVDC electrical source regulated by the DC-DC converter, and after the electrical voltage of the HVDC bus matches with the electrical voltage of the HVDC electrical source regulated by the DC-DC converter, switch the HVDC electrical source into the second switchable circuit such that unregulated electrical power is able to flow from the HVDC electrical source to the HVDC bus, and switch the DC-DC converter out of the second switchable circuit such that electrical power is unable to flow between the HVDC bus and the DC-DC converter. When the HVDC electrical source is switched into the second switchable circuit, unregulated electrical power is able to flow from the HVDC electrical source to a motor/generator electrically coupled to the HVDC bus.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
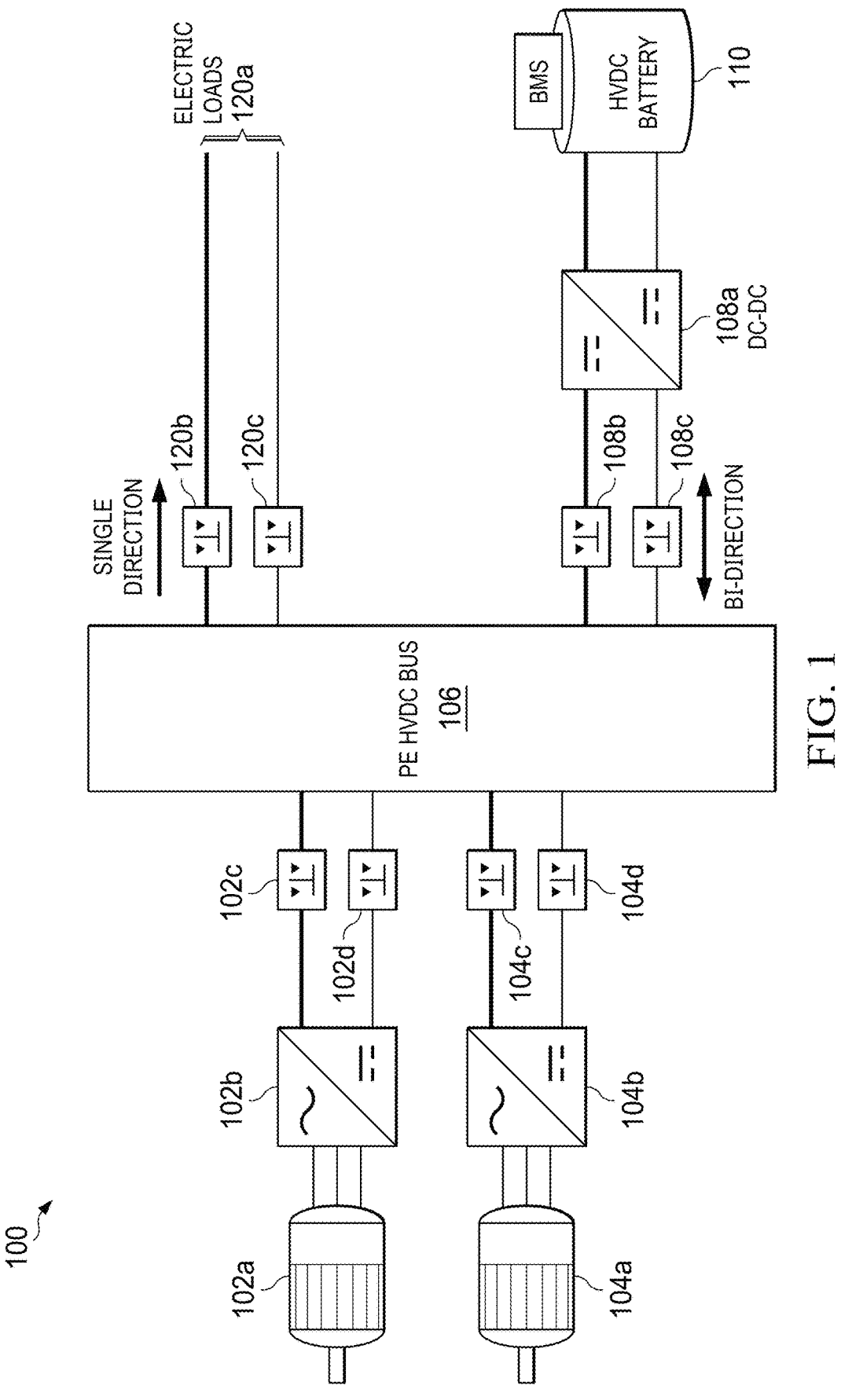
FIG. 1 illustrates an example regulated high voltage direct current (HVDC) architecture in accordance with this disclosure.
Figure 2:
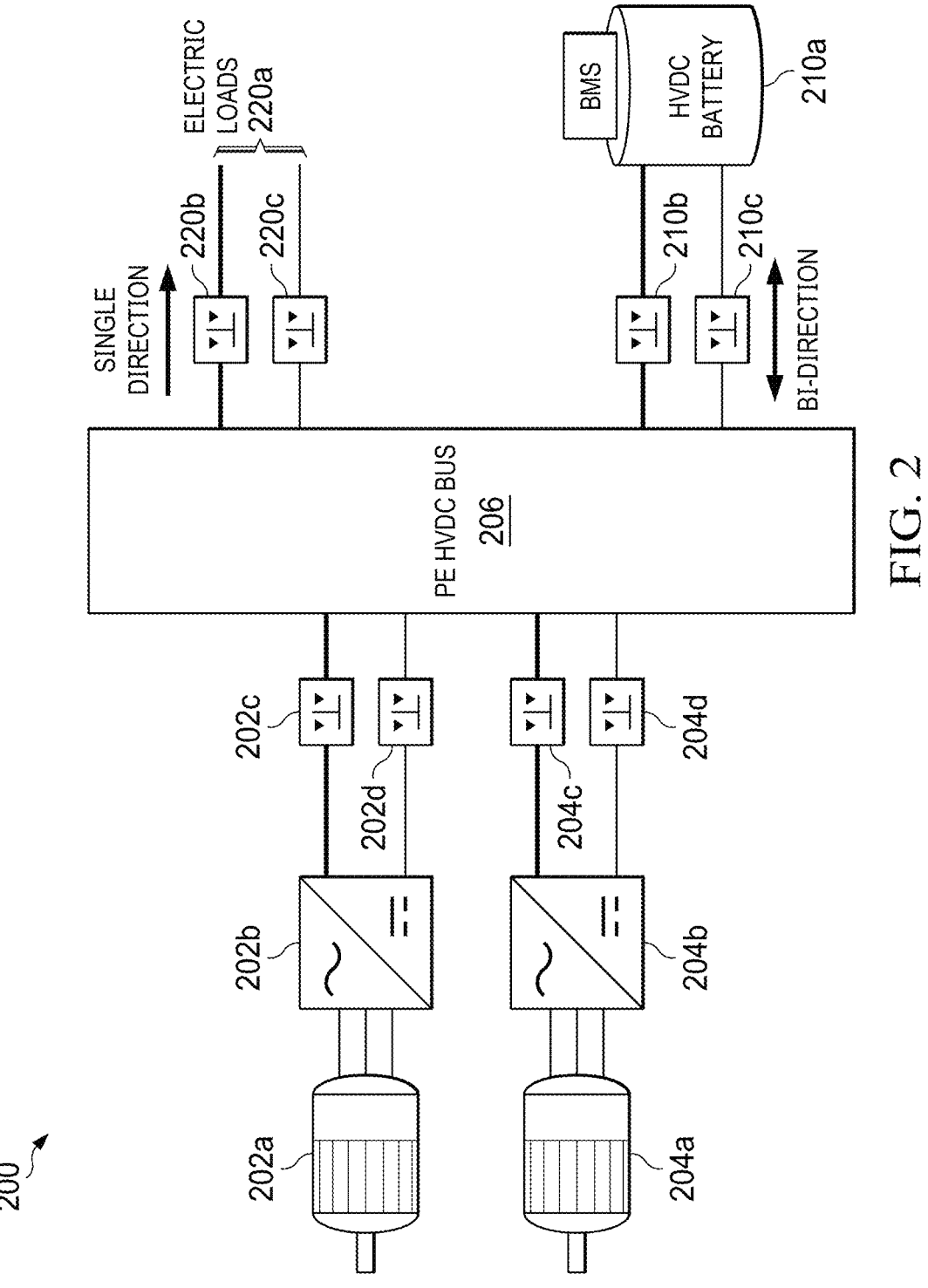
FIG. 2 illustrates an example unregulated HVDC architecture in accordance with this disclosure.
Figure 3:
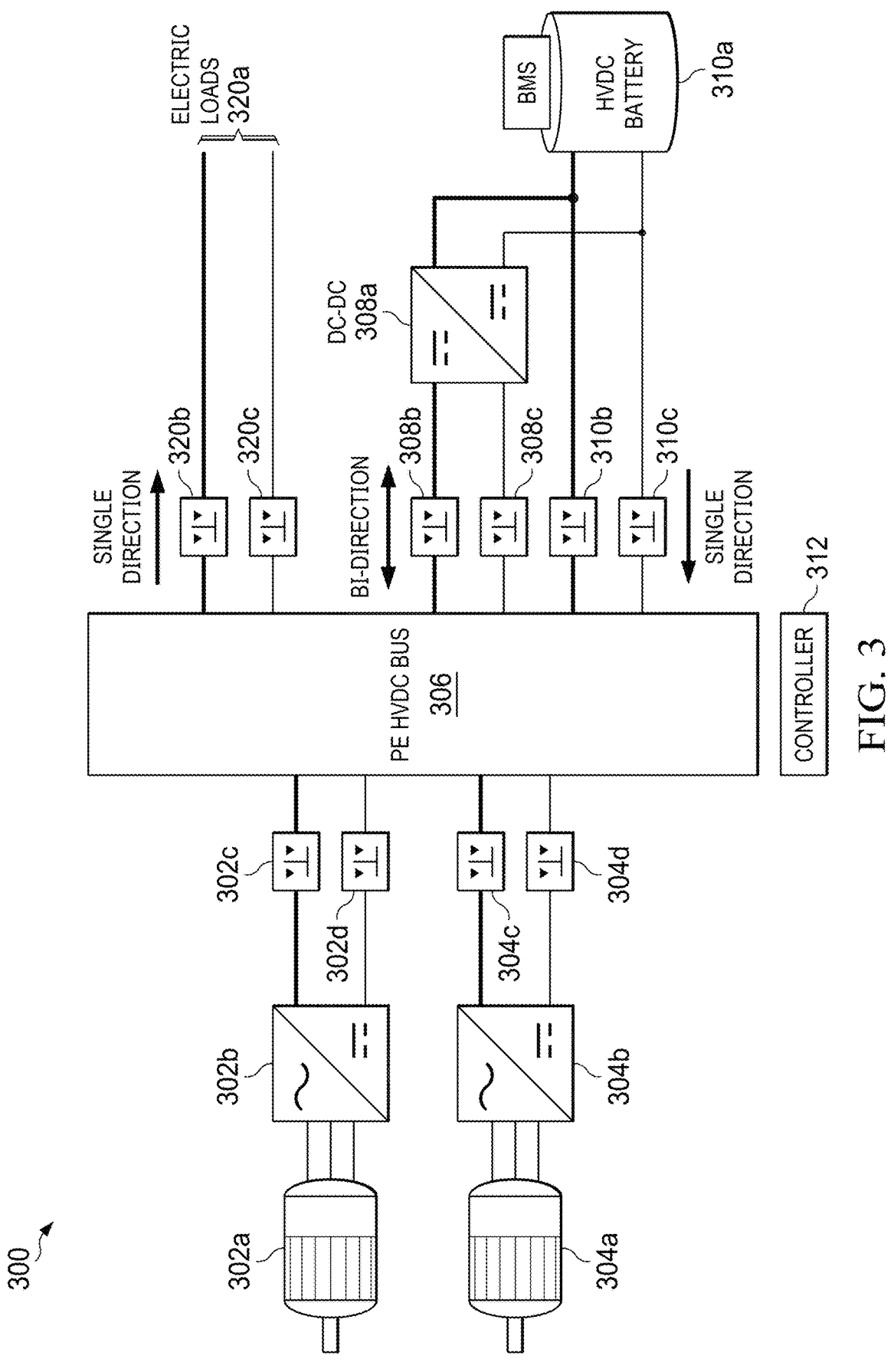
FIG. 3 illustrates an example conditionally regulated HVDC architecture in accordance with this disclosure.

FIGS. 1 through 3, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, a motor/generator in a mild hybrid electric propulsion architecture may operate in a motoring mode and a generation mode. Each of these modes may have operating constraints regarding voltage range and power conversion. During generation mode, the system voltage could be regulated to keep parameters within the power quality required by equipment utilizing the system voltage. The battery charging process should also utilize controlled power injection into the battery cells to avoid exceeding the battery charging capacity. In this case, a fully voltage regulated system will benefit the generation mode, providing a fixed voltage level in a main bus, which is typically used in a standard electrical system.

FIG. 1 illustrates an example regulated HVDC architecture 100 in accordance with this disclosure. For example, architecture 100 may be an HVDC architecture installed in an aircraft with a hybrid electric propulsion system. In the example of FIG. 1, a motor drive system includes a plurality of motor/generators 102a and 104a. Motor/generator 102a is electrically coupled to a first input/output of motor controller/power regulator 102*b*. A second input/output of motor controller/power regulator 102*b* may be electrically coupled to HVDC bus 106 via switches 102*c* and 102*d*. In a manner similar to motor/generator 102*a*, motor/generator 104*a* is electrically coupled to a first input/output of motor controller/power regulator 104*b*. A second input/output of motor controller/power regulator 104*b* may be electrically coupled to HVDC bus 106 via switches 104*c* and 104*d*. While motor/generators 102*a* and 104*a* are operating in motoring mode, motor/generators 102*a* and 104*a* may draw electrical power from HVDC bus 106 via motor controller/power regulators 102*b* and 104*b* respectively. While motor/generators 102*a* and 104*a* are operating in generating mode, motor/generators 102*a* and 104*a* may provide electrical power to HVDC bus 106 via motor controller/power regulators 102*b* and 104*b* respectively.

Architecture 100 further includes a bi-directional direct current to direct current (DC-DC) converter 108*a*. A first input/output of DC-DC converter 108*a* may be electrically coupled to HVDC bus 106 via switches 108*b* and 108*c*. A second input/output of DC-DC converter 108*a* is electrically coupled to HVDC electrical source 110. While HVDC electrical source 110 is depicted as a HVDC battery including a battery management system (BMS), it should be understood that HVDC electrical source 110 may be any HVDC unregulated power source. While motor/generators 102*a* and 104*a* are operating in motoring mode, HVDC electrical source 110 may provide electrical power to HVDC bus 106 via DC-DC converter 108*a*. While motor/generators 102*a* and 104*a* are operating in generating mode, HVDC electrical source 110 may receive electrical power from HVDC bus 106 via DC-DC converter 108*a* as needed to charge HVDC electrical source 110. Otherwise, while motor/generators 102*a* and 104*a* are operating in generating mode, electrical source 110 may provide electrical power to HVDC bus 106 via DC-DC converter 108*a* during power transients.

Architecture 100 further includes electric loads 120*a*, which may be electrically coupled to HVDC bus 106 via switches 120*b* and 120*c*. Electric loads 120*a* may draw electrical power from HVDC bus 106. In the example of FIG. 1, it should be understood that the various switches of architecture 100 may utilize any type of switching mechanism. For example, any of the switches of architecture 100 may be an electromechanical contactor, a solid state switch, an electronically controlled switch, etc. It should be further understood that architecture 100 may include additional electrical loads connected to HVDC bus 106.

Although FIG. 1 illustrates one example of a regulated HVDC architecture 100, various changes may be made to FIG. 1. For example, architecture 100 may have fewer or more motor/generators, or may exclude any of the switches shown in FIG. 1. In another example, architecture 100 may be part of an expanded hybrid electric system including multiple channels of HVDC buses, where each channel has characteristics similar to architecture 100. Also, while described herein as utilized in an aircraft with a hybrid electric propulsion system, architecture 100 may be utilized in any hybrid electric scenario. For example, architecture 100 may be utilized in a hybrid electric locomotive, a hybrid electric watercraft, etc.

While a fully voltage regulated system such as described regarding FIG. 1 will benefit the generation mode of a hybrid propulsion system, the DC-DC converter utilized to regulate the battery output should be sized for the worst case motoring mode, impacting the size, weight, and losses of the system. A fully unregulated system will benefit the motoring mode by way of a direct connection of the battery to the main bus and not utilizing the large DC-DC converter sized for the worst case motoring mode.

FIG. 2 illustrates an example unregulated HVDC architecture 200 in accordance with this disclosure. For example, architecture 200 may be an HVDC architecture installed in an aircraft with a hybrid electric propulsion system. In the example of FIG. 2, a motor drive system includes a plurality of motor/generators 202*a* and 204*a*. Motor/generator 202*a* is electrically coupled to a first input/output of motor controller/power regulator 202*b*. A second input/output of motor controller/power regulator 202*b* may be electrically coupled to HVDC bus 206 via switches 202*c* and 202*d*. In a manner similar to motor/generator 202*a*, motor/generator 204*a* is electrically coupled to a first input/output of motor controller/power regulator 204*b*. A second input/output of motor controller/power regulator 204*b* may be electrically coupled to HVDC bus 206 via switches 204*c* and 204*d*. While motor/generators 202*a* and 204*a* are operating in motoring mode, motor/generators 202*a* and 204*a* may draw electrical power from HVDC bus 206 via motor controller/power regulators 202*b* and 204*b* respectively. While motor/generators 202*a* and 204*a* are operating in generating mode, motor/generators 202*a* and 204*a* may provide electrical power to HVDC bus 206 via motor controller/power regulators 202*b* and 204*b* respectively.

Architecture 200 further includes an HVDC electrical source 210*a*. HVDC electrical source 210*a* may be electrically coupled to HVDC bus 206 via switches 210*b* and 210*c*. While HVDC electrical source 210 is depicted as a HVDC battery including a BMS, it should be understood that HVDC electrical source 210 may be any HVDC unregulated power source. While motor/generators 202*a* and 204*a* are operating in motoring mode, HVDC electrical source 210*a* may provide electrical power to HVDC bus 206. While motor/generators 202*a* and 204*a* are operating in generating mode, HVDC electrical source 210*a* may receive electrical power from HVDC bus 206 as needed to charge HVDC electrical source 210*a*. Otherwise, while motor/generators 202*a* and 204*a* are operating in generating mode, electrical source 210*a* may provide electrical power to HVDC bus 206 during power transients.

Architecture 200 further includes electric loads 220*a*, which may be electrically coupled to HVDC bus 206 via switches 220*b* and 220*c*. Electric loads 220*a* may draw electrical power from HVDC bus 206. In the example of FIG. 2, it should be understood that the various switches of architecture 200 may utilize any type of switching mechanism. For example, any of the switches of architecture 200 may be an electromechanical contactor, a solid state switch, an electronically controlled switch, etc. It should be further understood that architecture 200 may include additional electrical loads connected to HVDC bus 206.

Although FIG. 2 illustrates one example of an unregulated HVDC architecture 200, various changes may be made to FIG. 2. For example, architecture 200 may have fewer or more motor/generators or may exclude any of the switches shown in FIG. 2. In another example, architecture 200 may be part of an expanded hybrid electric system including multiple channels of HVDC buses, where each channel has characteristics similar to architecture 200. Also, while described herein as utilized in an aircraft with a hybrid electric propulsion system, architecture 200 may be utilized in any hybrid electric scenario. For example, architecture 200 may be utilized in a hybrid electric locomotive, a hybrid electric watercraft, etc.

While a fully unregulated system such as described regarding FIG. 2 will benefit the motoring mode of a hybrid propulsion system, during the generation mode the voltage regulated by the generator will should be controlled based on the battery state of charge (SoC), charging current injection, and the variable load demand of electric loads of other equipment included in the system. In such a scenario, the voltage range would still vary through the entire battery SoC range, and electric loads of other equipment included in the system should be designed to operate in that range. Such a voltage regulation is very complex.

In the operation of a hybrid propulsion system, high-power demand happens during phases where the motor drive system (MDS) operates as a motor. During the phases the MDS is generating and the battery is recharging, the power demand into/out of the batteries is much lower. During these lower power demand periods is when a regulated voltage drastically reduces the complexity of the charging process. Additionally, in an unregulated architecture as shown in FIG. 2, the architecture may overcharge the battery if the MDS loses control of the bus voltage, which may introduce a catastrophic fault on the battery. Based on this, the present disclosure provides a conditionally regulated voltage architecture where the system operates unregulated for MDS motoring and regulated for battery charging. This overcomes the disadvantages of a fully voltage regulated system as described in FIG. 1 and the fully voltage unregulated system as described in FIG. 2.

FIG. 3 illustrates an example conditionally regulated HVDC architecture 300 in accordance with this disclosure. For example, architecture 300 may be an HVDC architecture installed in an aircraft with a hybrid electric propulsion system. In the example of FIG. 3, a motor drive system includes a plurality of motor/generators 302a and 304a. Motor/generator 302a is electrically coupled to a first input/output of motor controller/power regulator 302b. A second input/output of motor controller/power regulator 302b may be electrically coupled to HVDC bus 306 via switches 302c and 302d. In a manner similar to motor/generator 302a, motor/generator 304a is electrically coupled to a first input/output of motor controller/power regulator 304b. A second input/output of motor controller/power regulator 304b may be electrically coupled to HVDC bus 306 via switches 304c and 304d. While motor/generators 302a and 304a are operating in motoring mode, motor/generators 302a and 304a may draw electrical power from HVDC bus 306 via motor controller/power regulators 302b and 304b respectively. While motor/generators 302a and 304a are operating in generating mode, motor/generators 302a and 304a may provide electrical power to HVDC bus 306 via motor controller/power regulators 302b and 304b respectively.

Architecture 300 further includes a bi-directional DC-DC converter 308a. In a first switchable circuit, a first input/output of DC-DC converter 308a may be electrically coupled to HVDC bus 306 via switches 308b and 308c. A second input/output of DC-DC converter 308a is electrically coupled to HVDC electrical source 310a. While HVDC electrical source 310a is depicted as a HVDC battery including a BMS, it should be understood that HVDC electrical source 310 may be any HVDC unregulated power source. In a second switchable circuit, HVDC electrical source 310a may be electrically coupled to HVDC bus 306 via switches 310b and 310c.

Architecture 300 further includes a controller 312. In one embodiment, controller 312 may include a memory, and a processor operably coupled to the memory. Controller 312 may be configured to configure the first and second switch-able circuits based on the operating mode of architecture 300. Controller 312 may be further configured to step down the voltage of the aircraft for safety reasons (e.g., ground operations). For example, controller 312 may switch the aircraft between a high voltage DC bus and a low voltage DC bus. The first switchable circuit may be referred to as a regulated channel, and the second switchable circuit may be referred to as an unregulated channel. Each channel can be sized for the power demand expected for its operational mode, which brings advantages of sizing and weight.

While motor/generators 302a and 304a are operating in motoring mode, controller 312 may switch DC-DC converter 308a out of the first switchable circuit (e.g., by controlling switches 308b and 308c) such that electrical power is unable to flow between HVDC bus 306 and DC-DC converter 308a, and controller 312 may switch HVDC electrical source 310a into the second switchable circuit (e.g., by controlling switches 310b and 310c) such that unregulated electrical power may flow from HVDC electrical source 310a to HVDC bus 306. This may be referred to as unregulated discharge mode. During this example of unregulated discharge mode, HVDC electrical source 310a may provide power to HVDC bus 306 that feeds the motor drive system. During this example of unregulated discharge mode, the voltage of HVDC bus 306 is driven by battery SoC and MDS power demand.

While motor/generators 302a and 304a are operating in generating mode, controller 312 may switch DC-DC converter 308a into the first switchable circuit (e.g., by controlling switches 308b and 308c) such that electrical power regulated by DC-DC converter 308a may flow between HVDC electrical source 310a and HVDC bus 306, and controller 312 may switch HVDC electrical source 310a out of the second switchable circuit (e.g., by controlling switches 310b and 310c) such that unregulated electrical power may not flow from HVDC electrical source 310a to HVDC bus 306 to prevent unwanted back feeding of voltage to HVDC electrical source 310a. This may be referred to as regulated mode. During this example of regulated mode, the MDS may generate power at a specific voltage setpoint so that HVDC bus 306 has a fixed voltage regulated according to the load demand. HVDC electrical source 310a is connected through the regulated channel where the DC-DC converter 308a controls voltage to charge electrical source 310a at acceptable current rates. As DC-DC converter 308a is bi-directional electrical source 310a can also provide power to HVDC bus 306 during power transients.

Architecture 300 further includes electric loads 320a, which may be electrically coupled to HVDC bus 306 via switches 320b and 320c. Electric loads 320a may draw electrical power from HVDC bus 306. In the example of FIG. 3, it should be understood that the various switches of architecture 300 may utilize any type of switching mechanism. For example, any of the switches of architecture 300 may be an electromechanical contactor, a solid state switch, an electronically controlled switch, etc. It should be further understood that architecture 300 may include additional electrical loads connected to HVDC bus 306.

In addition to the motoring and generating modes described herein, conditionally regulated HVDC architecture 300 allows for a pre-charge mode. During pre-charge mode, controller 312 may switch DC-DC converter into the first switchable circuit such that an electrical voltage of the HVDC bus matches with an electrical voltage of HVDC electrical source 310a regulated by DC-DC converter 308a. After the electrical voltage of HVDC bus 306 matches with the electrical voltage of HVDC electrical source 310a regulated by DC-DC converter 308*a*, controller 312 may switch HVDC electrical source 310*a* into the second switchable circuit such that unregulated electrical power may flow from HVDC electrical source 310*a* to HVDC bus 306, and controller 312 may switch DC-DC converter 308*a* out of the first switchable circuit such that electrical power is unable to flow between HVDC bus 306 the DC-DC converter 308*a*. Using DC-DC converter 308*a* for pre-charge eliminates using a dedicated pre-charge circuit and related switch gear.

Although FIG. 3 illustrates one example of a conditionally regulated HVDC architecture 300, various changes may be made to FIG. 3. For example, architecture 300 may have fewer or more motor/generators, or may exclude any of the switches shown in FIG. 3. In another example, architecture 300 may be part of an expanded hybrid electric system including multiple channels of HVDC buses, where each channel has characteristics similar to architecture 300. Also, while described herein as utilized in an aircraft with a hybrid electric propulsion system, architecture 300 may be utilized in any hybrid electric scenario. For example, architecture 300 may be utilized in a hybrid electric locomotive, a hybrid electric watercraft, etc.

Figure 4:
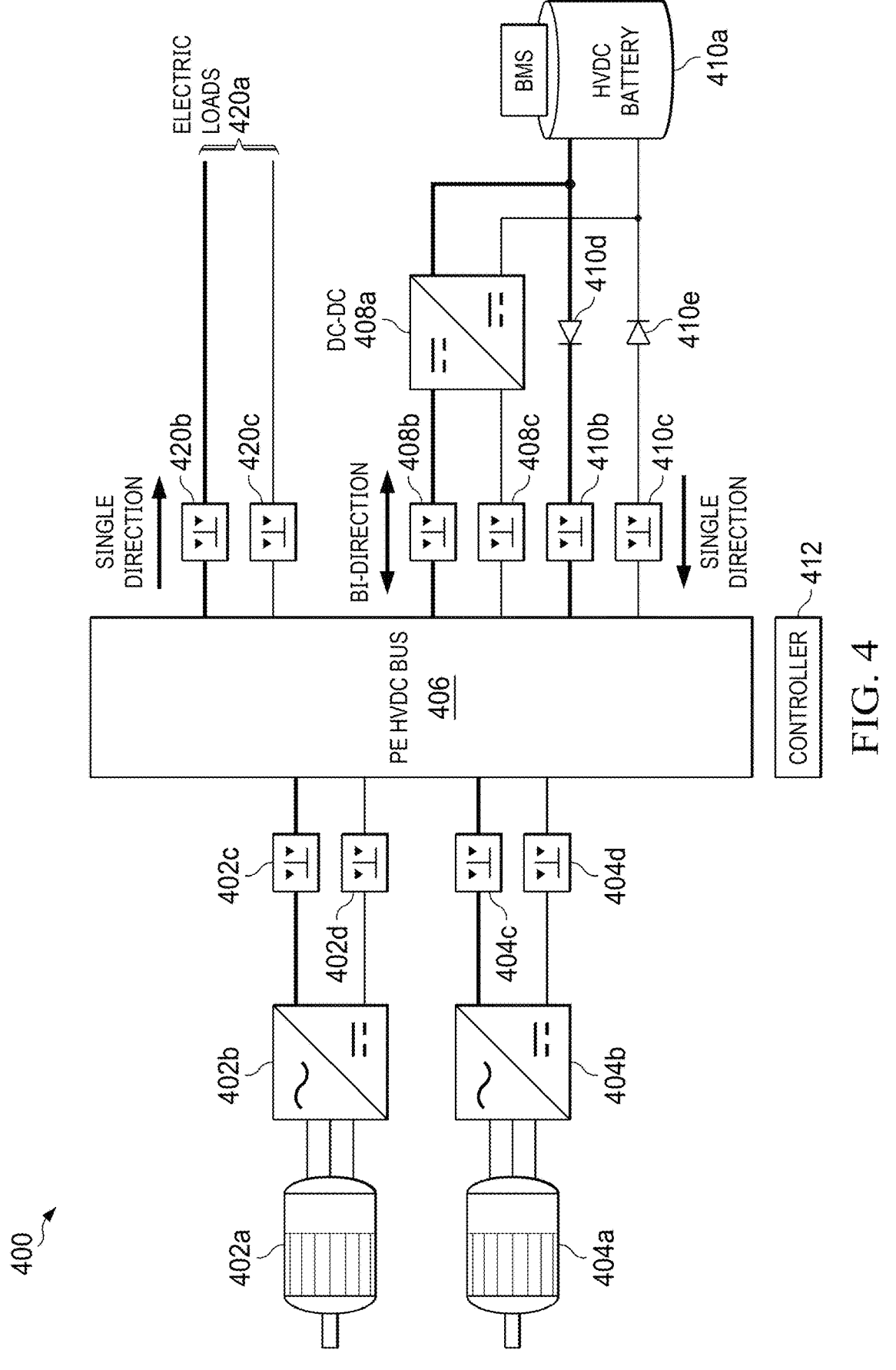
FIG. 4 illustrates an example conditionally regulated HVDC with charging protection architecture in accordance with this disclosure.

FIG. 4 illustrates an example conditionally regulated HVDC with charging protection architecture 400 in accordance with this disclosure. For example, architecture 400 may be an HVDC architecture installed in an aircraft with a hybrid electric propulsion system. In the example of FIG. 4, a motor drive system includes a plurality of motor/generators 402*a* and 404*a*. Motor/generator 402*a* is electrically coupled to a first input/output of motor controller/power regulator 402*b*. A second input/output of motor controller/power regulator 402*b* may be electrically coupled to HVDC bus 406 via switches 402*c* and 402*d*. In a manner similar to motor/generator 402*a*, motor/generator 404*a* is electrically coupled to a first input/output of motor controller/power regulator 404*b*. A second input/output of motor controller/power regulator 404*b* may be electrically coupled to HVDC bus 406 via switches 404*c* and 404*d*. While motor/generators 402*a* and 404*a* are operating in motoring mode, motor/generators 402*a* and 404*a* may draw electrical power from HVDC bus 406 via motor controller/power regulators 402*b* and 404*b* respectively. While motor/generators 402*a* and 404*a* are operating in generating mode, motor/generators 402*a* and 404*a* may provide electrical power to HVDC bus 406 via motor controller/power regulators 402*b* and 404*b* respectively.

Architecture 400 further includes a bi-directional DC-DC converter 408*a*. In a first switchable circuit, a first input/output of DC-DC converter 408*a* may be electrically coupled to HVDC bus 406 via switches 408*b* and 408*c*. A second input/output of DC-DC converter 408*a* is electrically coupled to HVDC electrical source 410*a*. While HVDC electrical source 410*a* is depicted as a HVDC battery including a BMS, it should be understood that HVDC electrical source 410 may be any HVDC unregulated power source. In a second switchable circuit, HVDC electrical source 410*a* may be electrically coupled to HVDC bus 406 via switches 410*b* and 410*c* and diodes 410*d* and 410*c*. Diodes 410*d* and 410*e* may protect electrical source 410*a* from direct charging current, so that charging of electrical source 410*a* may be controlled by DC-DC-converter 408*a*. While the second switchable circuit of architecture 400 utilizes diodes 410*d* and 410*c* to provide charging protection for electrical source 410*a*, it should be understood that the second switchable circuit may utilize any suitable charging protection mechanism, such as a semiconductor device.

Architecture 400 further includes a controller 412. In one embodiment, controller 412 may include a memory, and a processor operably coupled to the memory. Controller 412 may be configured to configure the first and second switchable circuits based on the operating mode of architecture 400. Controller 412 may be further configured to step down the voltage of the aircraft for safety reasons (e.g., ground operations). For example, controller 412 may switch the aircraft between a high voltage DC bus and a low voltage DC bus. The first switchable circuit may be referred to as a regulated channel, and the second switchable circuit may be referred to as an unregulated channel. Each channel can be sized for the power demand expected for its operational mode, which brings advantages of sizing and weight.

While motor/generators 402*a* and 404*a* are operating in motoring mode, controller 412 may switch DC-DC converter 408*a* out of the first switchable circuit (e.g., by controlling switches 408*b* and 408*c*) such that electrical power is unable to flow between HVDC bus 406 and DC-DC converter 408*a*, and controller 412 may switch HVDC electrical source 410*a* into the second switchable circuit (e.g., by controlling switches 410*b* and 410*c*) such that unregulated electrical power may flow from HVDC electrical source 410*a* to HVDC bus 406. This may be referred to as unregulated discharge mode. During this example of unregulated discharge mode, HVDC electrical source 410*a* may provide power to HVDC bus 406 that feeds the motor drive system. During this example of unregulated discharge mode, the voltage of HVDC bus 406 is driven by battery SoC and MDS power demand.

While motor/generators 402*a* and 404*a* are operating in generating mode, controller 412 may switch DC-DC converter 408*a* into the first switchable circuit (e.g., by controlling switches 408*b* and 408*c*) such that electrical power regulated by DC-DC converter 408*a* may flow between HVDC electrical source 410*a* and HVDC bus 406, and controller 412 may switch HVDC electrical source 410*a* out of the second switchable circuit (e.g., by controlling switches 410*b* and 410*c*) such that unregulated electrical power may not flow from HVDC electrical source 410*a* to HVDC bus 406 to prevent unwanted back feeding of voltage to HVDC electrical source 310*a*. This may be referred to as regulated mode. During this example of regulated mode, the MDS may generate power at a specific voltage setpoint so that HVDC bus 406 has a fixed voltage regulated according to the load demand. HVDC electrical source 410*a* is connected through the regulated channel where the DC-DC converter 408*a* controls voltage to charge electrical source 410*a* at acceptable current rates. As DC-DC converter 408*a* is bi-directional electrical source 410*a* can also provide power to HVDC bus 406 during power transients.

Architecture 400 further includes electric loads 420*a*, which may be electrically coupled to HVDC bus 406 via switches 420*b* and 420*c*. Electric loads 420*a* may draw electrical power from HVDC bus 406. In the example of FIG. 4, it should be understood that the various switches of architecture 400 may utilize any type of switching mechanism. For example, any of the switches of architecture 400 may be an electromechanical contactor, a solid state switch, an electronically controlled switch, etc. It should be further understood that architecture 400 may include additional electrical loads connected to HVDC bus 406.

In addition to the motoring and generating modes described herein, conditionally regulated HVDC architecture 400 allows for a pre-charge mode. During pre-charge mode, controller 412 may switch DC-DC converter into the first switchable circuit such that an electrical voltage of the HVDC bus matches with an electrical voltage of HVDC electrical source 410*a* regulated by DC-DC converter 408*a*. After the electrical voltage of HVDC bus 406 matches with the electrical voltage of HVDC electrical source 410*a* regulated by DC-DC converter 408*a*, controller 412 may switch HVDC electrical source 410*a* into the second switchable circuit such that unregulated electrical power may flow from HVDC electrical source 410*a* to HVDC bus 406, and controller 412 may switch DC-DC converter 408*a* out of the first switchable circuit such that electrical power is unable to flow between HVDC bus 406 the DC-DC converter 408*a*. Using DC-DC converter 408*a* for pre-charge eliminates using a dedicated pre-charge circuit and related switch gear.

Although FIG. 4 illustrates one example of a conditionally regulated HVDC architecture 400, various changes may be made to FIG. 4. For example, architecture 400 may have fewer or more motor/generators, or may exclude any of the switches shown in FIG. 4. In another example, architecture 400 may be part of an expanded hybrid electric system including multiple channels of HVDC buses, where each channel has characteristics similar to architecture 400. Also, while described herein as utilized in an aircraft with a hybrid electric propulsion system, architecture 400 may be utilized in any hybrid electric scenario. For example, architecture 400 may be utilized in a hybrid electric locomotive, a hybrid electric watercraft, etc.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed.

For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising: determining an operating mode of a hybrid electric propulsion system including a conditionally regulated high voltage direct current (HVDC) architecture, the conditionally regulated HVDC architecture including: a first switchable circuit formed between an HVDC bus, an HVDC electrical source, and a bi-directional direct current to direct current (DC-DC) converter configured to regulate electrical power flowing between the HVDC bus and the HVDC electrical source; and a second switchable circuit formed between the HVDC bus and the HVDC electrical source; and configuring the conditionally regulated HVDC architecture based on the determined operating mode, wherein, after switching the HVDC electrical source into the second switchable circuit, unregulated electrical power flows from the HVDC electrical source to a motor/generator electrically coupled to the HVDC bus.

2. The method of claim 1, wherein:
the operating mode is determined to be a motoring mode; and
configuring the conditionally regulated HVDC architecture comprises:
switching the DC-DC converter out of the first switchable circuit such that electrical power is unable to flow between the HVDC bus and the DC-DC converter; and
switching the HVDC electrical source into the second switchable circuit such that unregulated electrical power is able to flow from the HVDC electrical source to the HVDC bus.

3. The method of claim 1, wherein:
the operating mode is determined to be a generation mode; and
configuring the conditionally regulated HVDC architecture comprises:
switching the DC-DC converter into the first switchable circuit such that electrical power regulated by the DC-DC converter flows between the HVDC electrical source and the HVDC bus; and switching the HVDC electrical source out of the second switchable circuit such that unregulated electrical power is unable to flow between the HVDC electrical source and the HVDC bus.

4. The method of claim 3, wherein, after switching the DC-DC converter into the first switchable circuit, the HVDC electrical source receives power regulated by the DC-DC converter from the motor/generator electrically coupled to the HVDC bus.

5. The method of claim 1, wherein:
the operating mode is determined to be a pre-charge mode; and
configuring the conditionally regulated HVDC architecture comprises:
switching the DC-DC converter into the first switchable circuit such that an electrical voltage of the HVDC bus matches an electrical voltage of the HVDC electrical source regulated by the DC-DC converter; and
after the electrical voltage of the HVDC bus matches the electrical voltage of the HVDC electrical source regulated by the DC-DC converter:
switching the HVDC electrical source into the second switchable circuit such that unregulated electrical power flows from the HVDC electrical source to the HVDC bus; and
switching the DC-DC converter out of the first switchable circuit such that electrical power is unable to flow between the HVDC bus and the DC-DC converter.

6. The method of claim 5, wherein, after switching the HVDC electrical source into the second switchable circuit, unregulated electrical power flows from the HVDC electrical source to the motor/generator electrically coupled to the HVDC bus.

7. An apparatus comprising: at least one processor configured to: determine an operating mode of a hybrid electric propulsion system including a conditionally regulated high voltage direct current (HVDC) architecture, the conditionally regulated HVDC architecture including: a first switchable circuit formed between an HVDC bus, an HVDC electrical source, and a bi-directional direct current to direct current (DC-DC) converter configured to regulate electrical power flowing between the HVDC bus and the HVDC electrical source; and a second switchable circuit formed between the HVDC bus and the HVDC electrical source; and configure the conditionally regulated HVDC architecture based on the determined operating mode, wherein, when the HVDC electrical source is switched into the second switchable circuit, unregulated electrical power is able to flow from the HVDC electrical source to a motor/generator electrically coupled to the HVDC bus.

8. The apparatus of claim 7, wherein, to configure the conditionally regulated HVDC architecture when the operating mode is determined to be a motoring mode, the at least one processor is configured to:
switch the DC-DC converter out of the first switchable circuit such that electrical power is unable to flow between the HVDC bus and the DC-DC converter; and
switch the HVDC electrical source into the second switchable circuit such that unregulated electrical power is able to flow from the HVDC electrical source to the HVDC bus.

9. The apparatus of claim 7, wherein, to configure the conditionally regulated HVDC architecture when the operating mode is determined to be a generation mode, the at least one processor is configured to:

switch the DC-DC converter into the first switchable circuit such that electrical power regulated by the DC-DC converter is able to flow between the HVDC electrical source and the HVDC bus; and
switch the HVDC electrical source out of the second switchable circuit such that unregulated electrical power is unable to flow between the HVDC electrical source and the HVDC bus,
wherein, when the DC-DC converter is switched into the first switchable circuit, the HVDC electrical source is able to receive power regulated by the DC-DC converter from the motor/generator electrically coupled to the HVDC bus.

10. The apparatus of claim 7, wherein, to configure the conditionally regulated HVDC architecture when the operating mode is determined to be a pre-charge mode, the at least one processor is configured to:
switch the DC-DC converter into the first switchable circuit such that an electrical voltage of the HVDC bus matches an electrical voltage of the HVDC electrical source regulated by the DC-DC converter; and
after the electrical voltage of the HVDC bus matches with the electrical voltage of the HVDC electrical source regulated by the DC-DC converter:
switch the HVDC electrical source into the second switchable circuit such that unregulated electrical power is able to flow from the HVDC electrical source to the HVDC bus; and
switch the DC-DC converter out of the second switchable circuit such that electrical power is unable to flow between the HVDC bus and the DC-DC converter.

11. The apparatus of claim 10, wherein, when the HVDC electrical source is switched into the second switchable circuit, unregulated electrical power is able to flow from the HVDC electrical source to the motor/generator electrically coupled to the HVDC bus.

12. The apparatus of claim 7, wherein the at least one processor is configured to switch between the HVDC bus and a low voltage DC bus.

13. A system comprising:
an engine;
at least one motor/generator configured to:
provide mechanical power to the engine during a motoring mode; and
generate electricity from mechanical power provided by the engine during a generation mode;
a conditionally regulated high voltage direct current (HVDC) architecture electrically coupled to an input/output of the at least one motor/generator, the conditionally regulated HVDC architecture including:
a first switchable circuit formed between an HVDC bus, an HVDC electrical source, and a bi-directional direct current to direct current (DC-DC) converter configured to regulate electrical power flowing between the HVDC bus and the HVDC electrical source; and
a second switchable circuit formed between the HVDC bus and the HVDC electrical source; and
a controller configured to:
determine an operating mode of the system; and
configure the conditionally regulated HVDC architecture based on the determined operating mode,
wherein:
when the HVDC electrical source is switched into the second switchable circuit, unregulated electrical power is able to flow from the HVDC electrical source to the at least one motor/generator via the HVDC bus; and the system further comprises a charging protection circuit configured to prevent flow of electrical power from the HVDC bus to the HVDC electrical source.

14. The system of claim 13, wherein, to configure the conditionally regulated HVDC architecture when the operating mode is determined to be a motoring mode, the controller is configured to:

switch the DC-DC converter out of the first switchable circuit such that electrical power is unable to flow between the HVDC bus and the DC-DC converter; and switch the HVDC electrical source into the second switchable circuit such that unregulated electrical power is able to flow from the HVDC electrical source to the HVDC bus.

15. The system of claim 13, wherein, to configure the conditionally regulated HVDC architecture when the operating mode is determined to be a generation mode, the controller is configured to:

switch the DC-DC converter into the first switchable circuit such that electrical power regulated by the DC-DC converter is able to flow between the HVDC electrical source and the HVDC bus; and switch the HVDC electrical source out of the second switchable circuit such that unregulated electrical power is unable to flow between the HVDC electrical source and the HVDC bus.

16. The system of claim 15, wherein, when the DC-DC converter is switched into the first switchable circuit, the HVDC electrical source is able to receive power regulated by the DC-DC converter from the at least one motor/generator via the HVDC bus.

17. The system of claim 13, whereinto configure the conditionally regulated HVDC architecture when the operating mode is determined to be a pre-charge mode, the controller is configured to:

switch the DC-DC converter into the first switchable circuit such that an electrical voltage of the HVDC bus matches an electrical voltage of the HVDC electrical source regulated by the DC-DC converter; and after the electrical voltage of the HVDC bus matches with the electrical voltage of the HVDC electrical source regulated by the DC-DC converter:

switch the HVDC electrical source into the second switchable circuit such that unregulated electrical power is able to flow from the HVDC electrical source to the HVDC bus; and switch the DC-DC converter out of the second switchable circuit such that electrical power is unable to flow between the HVDC bus and the DC-DC converter; and when the HVDC electrical source is switched into the second switchable circuit, unregulated electrical power is able to flow from the HVDC electrical source to the at least one motor/generator.

\* \* \* \* \*